United States Patent
Wu

(10) Patent No.: US 6,883,058 B2
(45) Date of Patent: Apr. 19, 2005

(54) METHOD FOR IMPLEMENTING PC CARD BUS COMPATIBLE ELEMENT ON APPLICATION PCI BUS BASED APPARATUS AND CIRCUITS THEREFOR

(75) Inventor: Chien-Soon Wu, Hsinchu (TW)

(73) Assignee: D-Link Corp., Hsinchu (TW)

( * ) Notice: Subject to any disclaimer, the term of this patent is extended or adjusted under 35 U.S.C. 154(b) by 428 days.

(21) Appl. No.: 10/108,508

(22) Filed: Mar. 29, 2002

(65) Prior Publication Data

US 2003/0188082 A1 Oct. 2, 2003

(51) Int. Cl.⁷ .......................... G06F 13/36; G06F 13/20
(52) U.S. Cl. ..................................... 710/315; 710/313
(58) Field of Search ............................. 710/313, 315, 710/301, 302

(56) References Cited

U.S. PATENT DOCUMENTS 6,009,492 A * 12/1999 Matsuoka .................. 710/301
6,247,079 B1 * 6/2001 Papa et al. ................. 710/302
6,338,107 B1 * 1/2002 Neal et al. ................. 710/302
6,519,669 B1 * 2/2003 Yanagisawa ............... 710/304
6,728,822 B1 * 4/2004 Sugawara et al. .......... 710/311

* cited by examiner

*Primary Examiner*—Glenn A. Auve
*Assistant Examiner*—Nimesh Patel
(74) *Attorney, Agent, or Firm*—Bacon & Thomas, PLLC

(57) ABSTRACT

The present invention is a method of providing a bus switching device on an application PCI bus based apparatus for separating a command bus from data buses of a PCI bus; and providing a CPU on the application PCI bus based apparatus for controlling a switch of a line between the command bus and a PC Card bus compatible IC device, in response to a control signal sent from the CPU the bus switching device is activated for enabling the line between the command bus and the IC device so that the IC device is capable of receiving commands from the CPU and decoding the same for determining whether data sent from the data buses is required to be processed. Thus, it is possible of implementing a PC Card bus compatible element on an application PCI bus based apparatus and completely eliminating bus conflict problems.

3 Claims, 3 Drawing Sheets

METHOD FOR IMPLEMENTING PC CARD BUS COMPATIBLE ELEMENT ON APPLICATION PCI BUS BASED APPARATUS AND CIRCUITS THEREFOR

FIELD OF THE INVENTION

The present invention relates to Peripheral Component Interconnect (PCI) bus and more particularly to a method for implementing a PC Card bus compatible element on application PCI bus based apparatus and circuits therefor.

BACKGROUND OF THE INVENTION

Information technologies have known a rapid and a spectacular development leading to an increasing use of electronics and telecommunications in almost all trades and even our daily life. This facilitates information communication and increases efficiency. As a result, our life is more comfortable and our work is more productive Recently, there is a trend of developing slim electronic products among manufacturers. Further, various associated expansion cards are developed. Typically, such expansion cards are inserted in slots of circuit board of an electronic product. Thus, the electronic products are made more powerful.

Many expansion cards such as memory cards, modem cards, or network cards installed in notebook computers are typically Personal Computer Memory Card International Association (PCMCIA) devices. Also, a typical expansion card is about the size of a credit card so that it can be easily inserted in a PCMCIA slot of notebook computer. This is a typical example of slim product today. Another interface specification is PCI available from Intel Corp. PCI defines a local bus system which allows up to 10 PCI devices to install on a computer. Hence, various devices can be incorporated in an electric product. As a result, electronic products can be made slim as well as more powerful.

A bus system used in PCMCIA or PCI is PC Card bus or PCI bus respectively. Both buses are the same in most parts except the followings: PC Card bus has a unique design in a portion thereof so as to insert in a PCMCIA slot. The most significant difference is in data and control signal sent from PCI bus wherein a share bus is the main element in doing this. For example, in slots of desktop computer data buses in first and second slots are served to receive the same group of signals from PCI bus. Hence, a predetermined processing procedure is required in designing the slot so that central processing unit (CPU) of the computer can find a destination of the signals based on command. But as for PC Card bus slots each independently corresponds to a PC Card bus.

An electronic apparatus 2 in a known embedded system is shown in FIG. 1. The apparatus 2 comprises a CPU 22, a memory 23, and a PCI bus 21 served as a path for control and data communication therebetween. In a case that a suitable (either in functions or price) integrated circuit (IC) device is implemented on the apparatus 2 in design phase. If the IC device is originally designed to be used in PC Card bus based system a failure may occur due to bus conflict. In other words, the IC device is allowed to be implemented on PCI bus based apparatus only. Thus, an expansion device compatible to PCI bus has to be redesigned based on needs and PCI bus. This has the drawbacks of money and labor waste, slowing developing time of new electronic products, and reducing efficiency.

Moreover, the apparatus 2 further comprises a PC Card bus compatible IC device 24 being implemented on application PCI bus based apparatus such as the apparatus 2. The apparatus 2 further comprises a bridge IC device 25 on circuit board for adapting PCI bus 21 to PC Card bus. Bridge IC device 25 acts to adapt bus signals of PCI bus 21 to pins of IC device 24 corresponding to PC Card bus. Also, share bus of PCI bus is divided into two portions each coupled to an independent bus compatible to PC Card bus slot. Further, control signals are sent from bridge IC device 25. By utilizing this configuration, PC Card bus compatible ICs are capable of being implemented on application PCI bus based apparatus. However, the prior art suffered from several disadvantages. For example, the apparatus may become bulky (i.e., occupying precious space) due to many pins of the bridge IC device. Total cost is further increased. Moreover, it is neither aesthetic nor slim as contrary to what is expected by consumers. Thus improvement exists in order to overcome the above drawbacks of prior art.

SUMMARY OF THE INVENTION

It is therefore an object of the present invention to provide a method for implementing a PC Card bus compatible element on an application PCI bus based apparatus. The method comprises providing a bus switching device on the application PCI bus based apparatus for separating a command bus from data buses of a PCI bus; and providing a CPU on the application PCI bus based apparatus for controlling a switch of a line between the command bus and a PC Card bus compatible IC device, in response to a control signal sent from the CPU the bus switching device is activated for enabling the line between the command bus and the IC device so that the IC device is capable of receiving commands from the CPU and decoding the same for determining whether data sent from the data buses is required to be processed. By utilizing this method, as a PC Card bus compatible IC device installed in the apparatus, the apparatus can send a command to the PC Card bus compatible IC device directly for command decoding therein. As to commands not destined to the PC Card bus compatible IC, they are prohibited from doing above. Thus, it is possible of completely eliminating bus conflict and hence avoiding error.

It is another object of the present invention to provide a compact bus switching device to replace the conventional bulky bridge IC device having many pins. Thus, much space of circuit board of the apparatus is saved for other advantageous purposes.

It is still another object of the present invention to enable developers to eliminate the needs to redesign an element compatible to PCI bus as long as functions or price acceptable and the element installable on the apparatus. Thus, the invention can save money and labor, accelerate developing time of new electronic products, and increase efficiency.

The above and other objects, features and advantages of the present invention will become apparent from the following detailed description taken with the accompanying drawings.

DETAILED DESCRIPTION OF THE PREFERRED EMBODIMENTS

Conventionally, system bus of an electronic apparatus is classified as either share bus or standalone bus based on signal transmission implementations. The differences between both buses are detailed below. CPU of the apparatus issues a programming command on an IC device coupled to either bus. Next, if the bus is a standalone bus the IC device coupled to the standalone bus is required to decode the command itself only. This is because the destination of the command issued by CPU must be directed to the IC device. To the contrary, if the bus is a share bus the IC device coupled to the share bus is required to have capability of command decoding since there are more than one IC devices on the share bus. In response to the decoding, a correct determination is carried out as to whether the destination of command issued by CPU is the IC device itself. Finally, further processing may be conducted based on the command.

As stated above, a known PCI bus is the type of share bus and comprises a bus signal line for configuration read/write. Thus, CPU of electronic apparatus may use the bus signal line to program each IC device coupled to PCI bus. For read/write setting, in general an IDSEL signal is used to indicate a destination of CPU's command. As to slots of various IC devices coupled to PCI bus, specifically the slots are coupled to various bus signal lines AD. For example, slot of first IC device is coupled to signal line AD31 and slot of second IC device is coupled to signal line AD30. Thus, an IC device can determine whether a reply of command issued by CPU is necessary based on a received IDSEL signal. If yes, it means that the IC device is one that is to be programmed by CPU. Thus, the IC device has to decode the command and hence perform a required processing. Conversely, it means that the IC device is not one that is to be programmed by CPU. Thus, the IC device does not have to process the command sent from the bus. Otherwise, a conflict may occur, resulting in an erroneous signal.

To the contrary, PC Card bus is the type of standalone bus. Thus, various IC devices coupled to PC Card bus are typically coupled to standalone bus in a scheme. Hence, all destinations of commands issued by CPU are directed to IC devices of the type. As such, the type of IC does not have to determine a destination of command issued by CPU by IDSEL signal. Hence, such IC devices do not comprise pins for receiving IDSEL signals. In view of above, if a PC Card bus compatible IC device is inserted in slots the PC Card bus compatible IC device may be erroneously identified as a destination programmed by CPU. Consequently, an erroneous signal is sent or an erroneous processing is performed. This can cause related IC devices coupled to PCI bus to send reply signal. As a result, a conflict and thus error occur.

Figure 1:
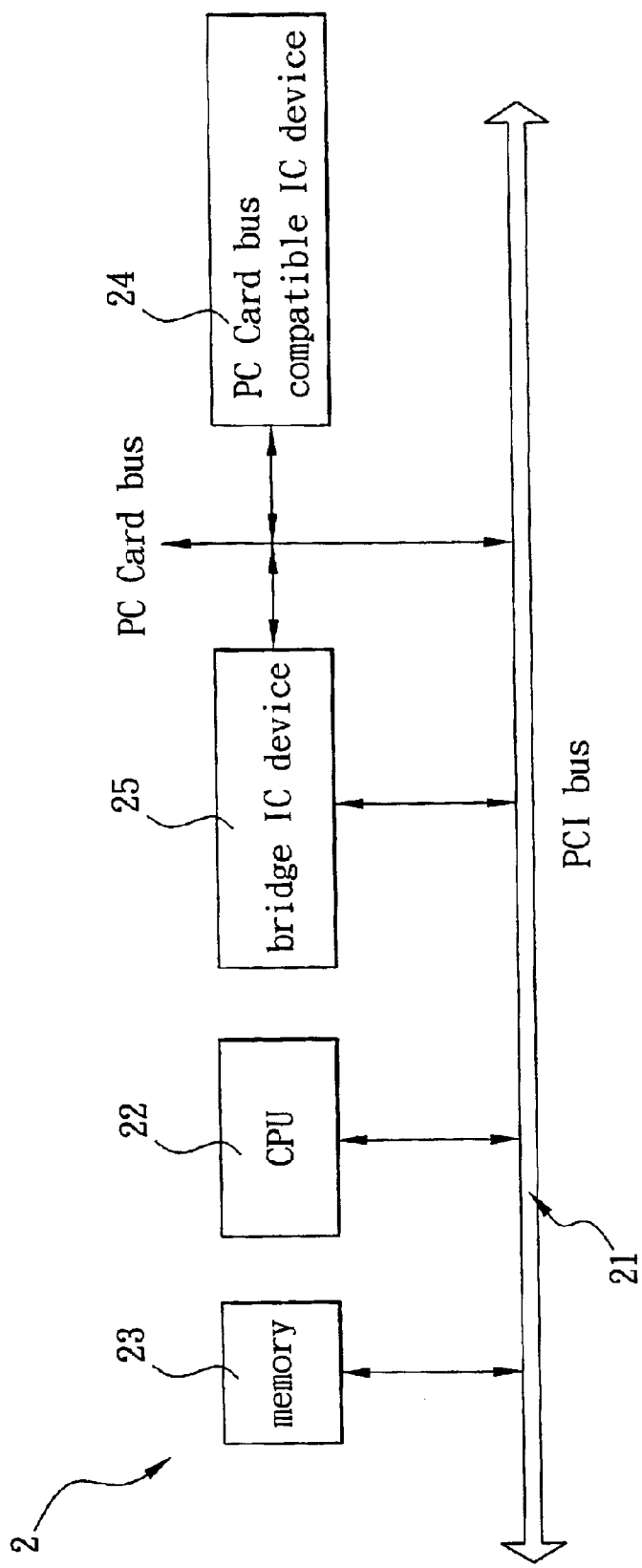
FIG. 1 presents schematically a system structure of a conventional electronic apparatus wherein a bridge IC device is installed for implementing a PC Card bus compatible IC on application PCI bus based apparatus.
Figure 2:
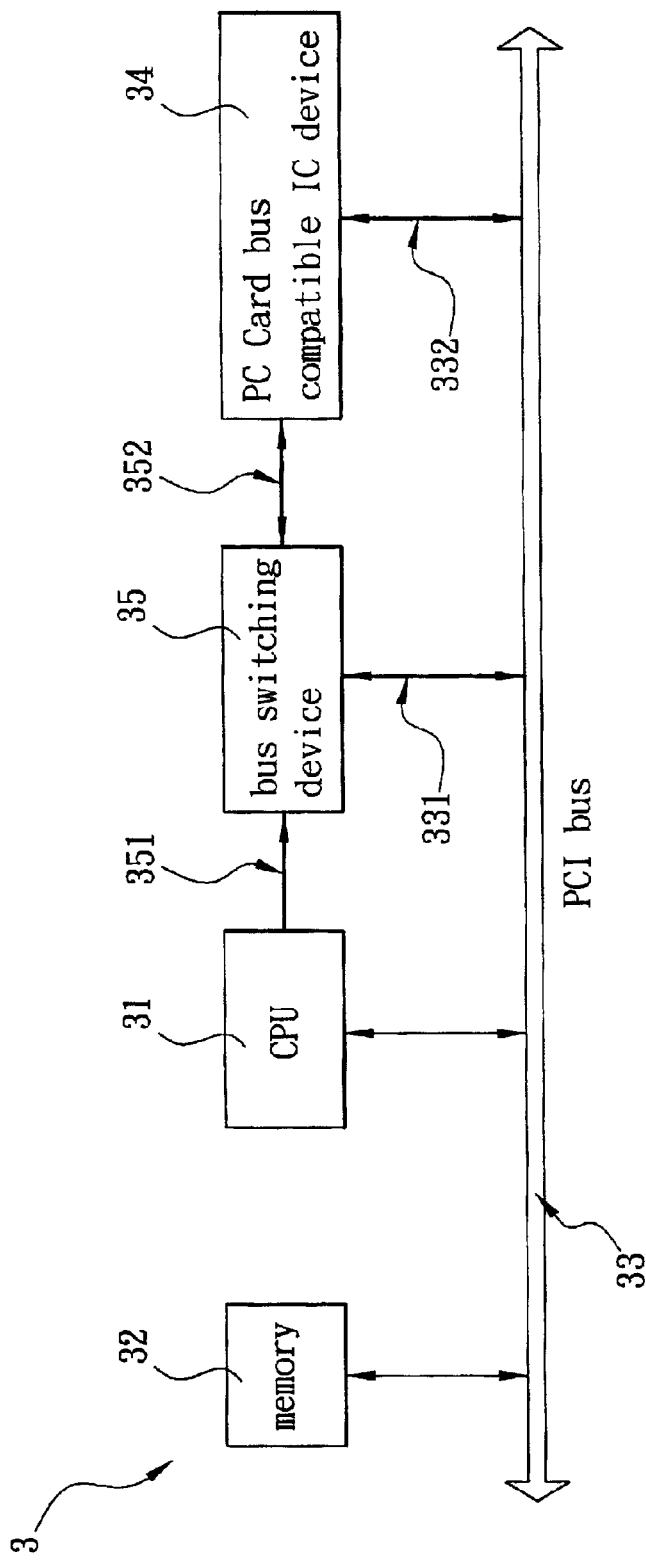
FIG. 2 presents schematically a system structure of an electronic apparatus according to the invention.

Referring to FIG. 2, there is shown a PCI bus compatible electronic apparatus 3 according to the invention. The apparatus 3 comprises a CPU 31, at least one memory 32, and a PCI bus 33 coupled to CPU 31 and memory 32 respectively so that CPU 31 may read or write data from or into memory 32. The apparatus 3 further comprises at least one slot. Signal lines of PCI bus 33 comprise a command bus 331 served as a signal line for sending commands and data buses 332 served as a signal line for sending data. Each data bus 332 is coupled to pins of slot. A PC Card bus compatible IC device 34 is inserted in the slot so that PC Card bus compatible IC device 34 may receive commands from CPU 31 or send a reply signal to CPU 31 via PCI bus 33.

In the embodiment shown in FIG. 2, the characteristic of apparatus 3 is the provision of bus switching device 35. Bus switching device 35 acts to separate command bus 331 (served for sending C/BE command and FRAME# signal required for decoding command) from data buses 332. Bus switching device 35 comprises a control signal line 351 coupled to CPU 31 so that CPU 31 may send a control signal to bus switching device 35. Thus, bus switching device 35 is able to control a switching of bus switching device 35 based on the control signal. With a PC Card bus compatible IC device 34 inserted in slot of apparatus 3, in a case that CPU 31 desires to issue a command to PC Card bus compatible IC device 34 CPU 31 may send a control signal to bus switching device 35 via control signal line 351. Hence, line 352 between C/BE command bus 331 and the IC device 34 is enabled by bus switching device 35. As a result, the IC device 34 may receive C/BE command and FRAME# signal required for decoding command and hence decode C/BE command for determining whether data sent from data buses 332 is required to be processed. In a case that CPU 31 does not issue command to the IC device 34, bus switching device 35 may disable line 352 between C/BE command bus 331 and the IC device 34 as commanded by another control signal sent from CPU 31 via control signal line 351. As a result, the IC device 34 is prohibited from receiving data from data buses 332. As an end, it is possible of completely eliminating bus conflict and hence avoiding error.

In addition to configuration read/write command, commands sent by C/BE command bus 331 further comprises memory read/write and input/output (I/O) read/write commands. Hence, a single bus switching device 35 is allowed to control only the PC Card bus compatible IC device 34. In a case that at least two PC Card bus compatible IC devices 34 are to be provided on the apparatus 3 the same number of bus switching devices 35 is required to cooperate with corresponding ones. Each bus switching device 35 acts to control a status of read/write command sent to the IC device 34. As to other commands sent from command bus 331, they are required to send to the IC device 34.

Figure 3:
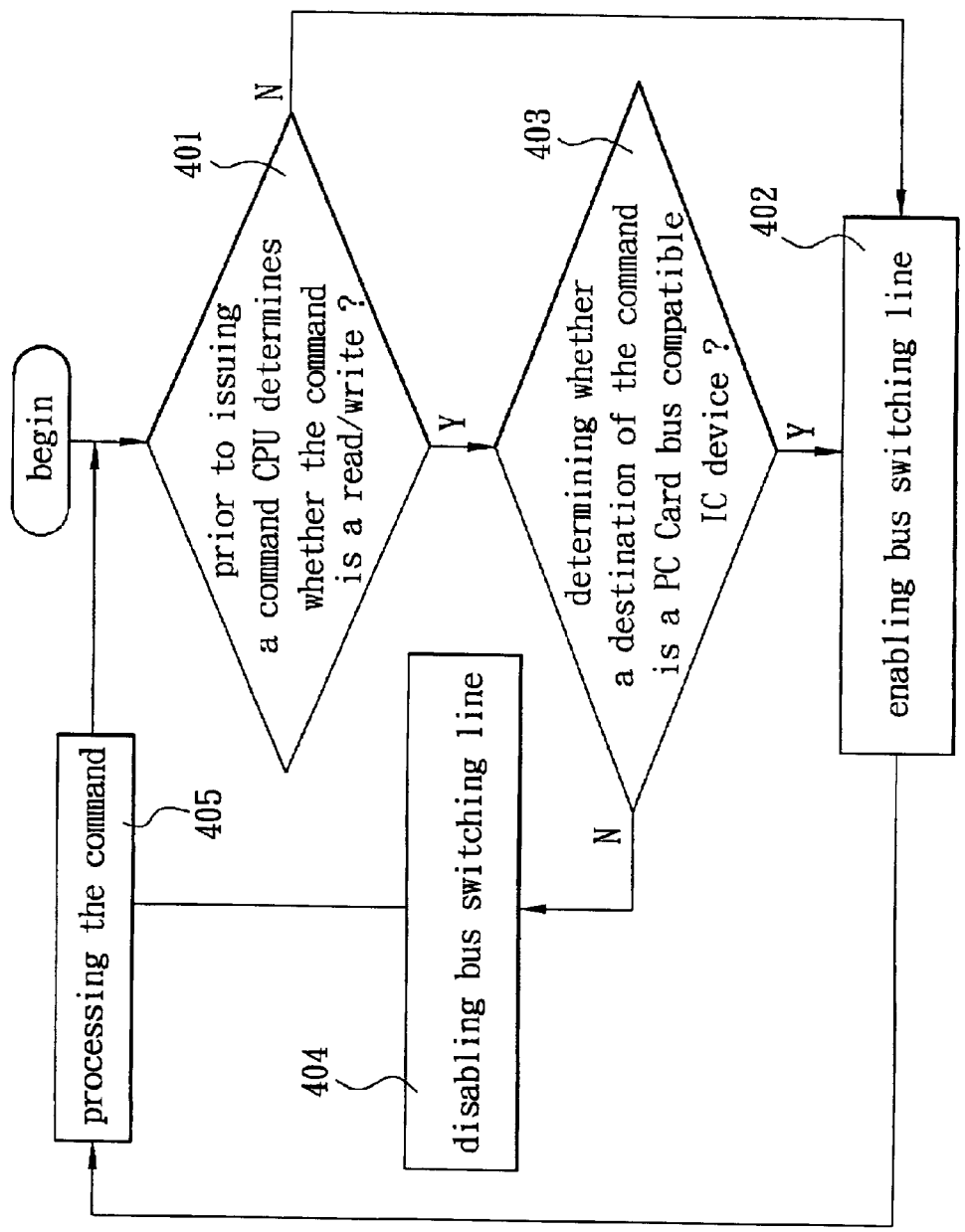
FIG. 3 is a flow chart illustrating a process according to the invention.

Referring to FIG. 3, there is shown a flow chart illustrating a process performed by the apparatus 3 according to the invention. It is intended by the apparatus 3 that the PC Card bus compatible IC device 34 may receive commands and data from CPU 31 via PCI bus 33. The process comprises the following steps:

In step 401, prior to issuing a command CPU 31 determines whether the command is a read/write command. If yes, the process jumps to step 403. Otherwise, issues an activation signal to the bus switching device 35 via the control signal line 351, and goes to step 402.

In step 402, line 352 between C/BE command bus 331 and the IC device 34 is enabled when the activation signal issued by CPU 31 is received by bus switching device 35 via control signal line 351. The process goes to step 405.

In step 403, CPU 31 further determines whether a destination of the command is a PC Card bus compatible IC device 34. If yes, issues an activation signal to the bus switching device 35 via the control signal line 351, and goes to step 402. Otherwise, issues a deactivation signal to the bus switching device 35 via the control signal line 351, and goes to step 404.

In step 404, line 352 between C/BE command bus 331 and the IC device 34 is disabled when the deactivation signal issued by CPU 31 is received by bus switching device 35. The process goes to step 405.

In step 405, as the command sent from C/BE command bus 331 is received by the IC device 34, decoding and thus processing are performed on the command. As a result, it is possible of determining whether it is necessary to process data sent from data buses 332. The process loops back to step 401 for waiting the command sent from the CPU.

In brief, the invention replaces the conventional bulky bridge IC device having many pins with a bus switching device 35. Hence, in a case that a PC Card bus compatible IC device is provided on an electronic apparatus, the apparatus can send a command to the PC Card bus compatible IC device directly for command decoding therein. As to commands not destined to the PC Card bus compatible IC, they are prohibited from doing above. The invention thus has the advantages of completely eliminating bus conflict, saving cost and space of bridge IC device, for developers without having to redesign an element compatible to PCI bus as long as functions or price acceptable and the element installable on the apparatus, saving money and labor, accelerating developing time of new electronic products, and increasing efficiency.

While the invention has been described by means of specific embodiments, numerous modifications and variations could be made thereto by those skilled in the art without departing from the scope and spirit of the invention set forth in the claims.

What is claimed is:

1. A method for implementing a personal computer (PC) card bus compatible element on an application peripheral component interconnect (PCI) bus based apparatus, the method comprising:

providing a bus switching device on the application PCI bus based apparatus for separating a command bus from data buses of a PCI bus; and providing a central processing unit (CPU) on the application PCI bus based apparatus for controlling a switch of a line between the command bus and a PC Card bus compatible IC device;

prior to issuing a command, the CPU determining whether the command is either a read or write command, the CPU sending an activation signal to the bus switchman device if the command is not a read or write command; and in response to the received activation signal, activating the bus switching device for enabling a line between the command bus and the PC Card bus compatible IC device so that the PC Card bus compatible IC device is capable of receiving the command from the command bus and decoding the same for determining whether data sent from the data buses is required to be processed.

2. The method of claim 1, further comprising the steps of:

if the command is a read or write command, the CPU further determining whether a destination of the command is the PC Card bus compatible IC device; and if the destination of the command is the PC Card bus compatible IC device, the CPU sending the activation signal to the bus switching device.

3. The method of claim 2, further comprising the steps of:

if the destination of the command is not the PC Card bus compatible IC device, the CPU sending a deactivation signal to the bus switching device; and in response to the received deactivation signals deactivating the bus switching device for disabling the line between the command bus and the PC Card bus compatible IC device, thereby commanding the method to return to a step of waiting for the command to be sent from the CPU.

* * * * *